United States Patent
Takayanagi

(10) Patent No.: US 7,861,603 B2
(45) Date of Patent: Jan. 4, 2011

(54) CORIOLIS MASS FLOWMETER INCLUDING AN INNER PIPE MADE OF FLUORORESIN AND OUTER PIPE HAVING FIBERS

(75) Inventor: Susumu Takayanagi, Osaka (JP)

(73) Assignee: Keyence Corporation, Osaka-shi, Osaka (JP)

( * ) Notice: Subject to any disclaimer, the term of this patent is extended or adjusted under 35 U.S.C. 154(b) by 103 days.

(21) Appl. No.: 12/328,845

(22) Filed: Dec. 5, 2008

(65) Prior Publication Data

US 2009/0173167 A1 Jul. 9, 2009

(30) Foreign Application Priority Data

Jan. 7, 2008 (JP) .............................. 2008-000318

(51) Int. Cl.
*G01F 1/84* (2006.01)
(52) U.S. Cl. ................................................. 73/861.355
(58) Field of Classification Search .................. None
See application file for complete search history.

(56) References Cited

U.S. PATENT DOCUMENTS

| | | | | |
|---|---|---|---|---|
| 4,187,721 A | * | 2/1980 | Smith | 73/861.356 |
| 4,422,338 A | * | 12/1983 | Smith | 73/861.356 |
| 5,269,191 A | * | 12/1993 | Wada | 73/861.12 |
| 5,918,285 A | | 6/1999 | Van der Pol | |
| 5,995,696 A | * | 11/1999 | Miyagi et al. | 385/125 |
| 7,155,983 B2 | * | 1/2007 | Wehrs et al. | 73/861.12 |
| 2010/0005906 A1 | * | 1/2010 | Shimizu et al. | 73/861.357 |

FOREIGN PATENT DOCUMENTS

| | | |
|---|---|---|
| JP | 64-15921 U | 1/1989 |
| JP | 2-6954 B | 2/1990 |
| JP | 6-29689 Y | 8/1994 |
| JP | 2850556 B | 11/1998 |
| WO | 97/44640 A | 11/1997 |

* cited by examiner

*Primary Examiner*—Harshad Patel
(74) *Attorney, Agent, or Firm*—Smith Patent Office

(57) ABSTRACT

A Coriolis flowmeter includes an oscillator for oscillating a fluid pipe that forms a flow path for allowing a measurement fluid to flow; first and second detectors that are disposed to be spaced apart from each other along the flow path of the fluid pipe so as to detect a state of oscillation of the fluid pipe; and a calculator for calculating a mass flow rate of the measurement fluid that passes through the flow path of the fluid pipe on the basis of a relative amount of the states of oscillation that are detected by the first and second detectors. The fluid pipe includes an inner pipe made of a fluororesin whose inner circumferential surface is in contact with the flow path, and an outer pipe having fibers that are arranged in order to surround an outer circumferential surface of the inner pipe and a resin that is cured in a state of close adhesion between the fibers arranged in order, and having an elastic modulus larger than that of the inner pipe.

16 Claims, 10 Drawing Sheets

FIG. 7A  SATIN WEAVE
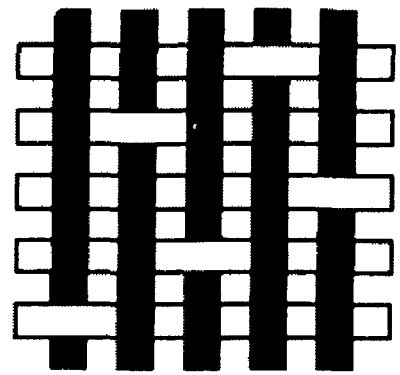
FIG. 7B  TWILL WEAVE
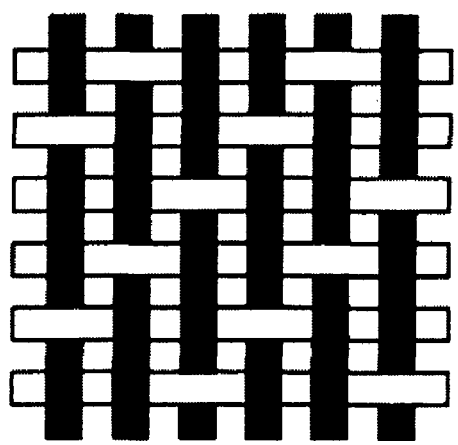
FIG. 7C  PLAIN WEAVE
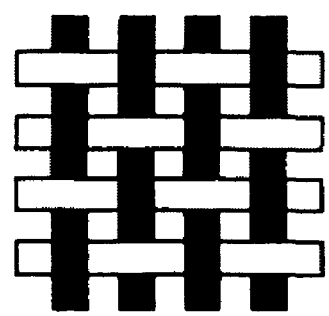

CORIOLIS MASS FLOWMETER INCLUDING AN INNER PIPE MADE OF FLUORORESIN AND OUTER PIPE HAVING FIBERS

CROSS-REFERENCE TO RELATED APPLICATIONS

The present application claims foreign priority based on Japanese Patent Application No. 2008-000318, filed Jan. 7, 2008, the contents of which is incorporated herein by reference.

BACKGROUND OF THE INVENTION

1. Field of the Invention

The present invention relates to a Coriolis mass flowmeter that generates a Coriolis force, i.e. a force that acts in proportion to the mass flow rate of a fluid flowing through a pipe by forcibly oscillating the pipe and detecting the phase difference of the oscillations on the upstream side and the downstream side of the pipe to determine a mass flow rate.

2. Description of the Related Art

A Coriolis flowmeter forcibly oscillates with an oscillator a fluid pipe that passes a fluid as an object of measurement, and detects the phase difference of the oscillations that is generated on the upstream side and the downstream side of the flow path in accordance with the flow rate of the mass of the fluid, thereby to determine a mass flow rate on the basis of the phase difference.

In order to generate an oscillation with a good efficiency, it is general to oscillate the Coriolis flow meter at a characteristic frequency of the fluid pipe as a beam. Major elements that determine this characteristic frequency of the fluid pipe are the elastic modulus (longitudinal elastic coefficient (Young's modulus)) f the fluid pipe material and the shape of the fluid pipe. A pipe made of metal is often used as a fluid pipe of a mass flowmeter because this elastic modulus is stable in terms of the temperature and the shape is stable with lapse of time.

On the other hand, when a fluid that corrodes a metal is used as an object of measurement, or when one wishes to prevent elution of metal ions to the measurement fluid, it is necessary to perform chemical resistance treatment on the inner side surface of the fluid pipe made of the metal. As an example thereof, Japanese Utility Model Application Laid-Open (JP-A) No. S64-15921 (front page) discloses a flowmeter in which the inner circumferential surface of the fluid pipe is coated with fluororesin. According to the invention of JP-A No. S64-15921, when the pipe diameter is small, the coating is difficult, and in particular, when there is a bent portion, a degree of difficulty is increased.

Also, as another requirement, there is a requirement that no metal is used at all as a material of the pipe because a fluororesin coating has a difficulty in increasing the film thickness and also it is difficult to confirm whether the coating has been done with certainty, whereby the fear of elution of the metal ions into the fluid pipe cannot be eliminated. Therefore, a fluid pipe made of a fluororesin alone (PFA tube) is proposed, for example, in WO 97/44640.

However, when the fluid pipe is made of fluororesin alone, there is a fear of change in the elastic modulus by temperature or creep phenomenon with lapse of time. In principle, the Coriolis mass flowmeter performs measurements by oscillating the fluid pipe. Since the change in the elastic modulus affects the oscillation, it may hinder a correct measurement of the mass flow rate.

Further, in the case of a PFA tube, when the fluid flowing through the fluid path is a chemical drug, the chemical drug penetrates through the tube, whereby an ambient gas such as water vapor or ammonia reacts with the chemical drug. The reaction product thereof is precipitated on the outer surface of the tube, thereby decreasing the mechanical strength of the tube.

SUMMARY OF THE INVENTION

An object of the present invention is to provide a Coriolis flowmeter having a chemical resistance, raising no fear of elution of metal ions, being able to reduce the diameter of the fluid pipe, being able to perform measurements that are stable against the temperature change, and being able to reduce the influence of deterioration with lapse of time.

In order to achieve the above described object, the present invention is a flowmeter including an oscillator for oscillating a fluid pipe that forms a flow path for allowing a measurement fluid to flow, first and second detectors that are disposed to be spaced apart from each other along the flow path of the fluid pipe so as to detect a state of oscillation of the fluid pipe, and a calculator for calculating a mass flow rate of the measurement fluid that passes through the flow path of the fluid pipe on the basis of a relative amount of the states of oscillation that are detected by the first and second detectors, wherein the fluid pipe includes an inner pipe made of a fluororesin whose inner circumferential surface is in contact with the flow path, and an outer pipe having fibers that are arranged in order to surround an outer circumferential surface of the inner pipe and a resin that is cured in a state of close adhesion between the fibers arranged in order, and having an elastic modulus larger than that of the inner pipe.

In the present invention, since the inner pipe of the fluid pipe is made of a fluororesin, it is not corroded by chemicals.

In particular, since the inner pipe is covered with the outer pipe, there is no fear that the chemical drugs that have penetrated through the inner pipe may be brought into contact with the ambient gas such as water vapor or ammonia. For this reason, the deterioration of the inner pipe is less likely to proceed, and the fluid pipe is excellent in chemical resistance.

Also, since the outer pipe made of resin and the nonmetal fibers is disposed on the outside of the inner pipe, there is no fear of elution of the metal ions.

Also, since the outer pipe having a larger elastic modulus is made of what is known as a fiber reinforced plastics in which the resin is cured in close adhesion between the fibers, the rigidity of the fluid pipe increases in an outstanding manner as compared with a pipe made of fluororesin. Moreover, since it is reinforced by the fibers, the change in the elastic modulus by temperature or the creep phenomenon with lapse of time can be greatly reduced.

Therefore, stable measurements can be made against the temperature change, and also the deterioration of the measurement precision with lapse of time can be reduced.

BRIEF DESCRIPTION OF THE DRAWINGS

FIG. 5(a) is a plan view; FIG. 5(b) is an outer side view; and FIG. 5(c) is an inner side view;

FIGS. 6(a) and 6(d) are each a plan view; FIGS. 6(b) and 6(e) are each an outer side view; and FIGS. 6(c) and 6(f) are each an inner side view;

FIGS. 7A to 7C are each a plan view illustrating an example of the weave structure;

DETAILED DESCRIPTION OF THE PREFERRED EMBODIMENTS

In the present invention, the fluid pipe may include a bent portion whose axial line is bent between the two detectors or a straight pipe portion whose axial line is a straight line between the two detectors.

When the fluid pipe is formed approximately in an U-shape between the two detectors and a support member supports the two ends of the U-shaped fluid pipe so that the two ends are the fixed ends of oscillation, that is when the support is made in a cantilever beam manner, a large oscillation amplitude is obtained with a small oscillation force as compared with a case in which the fluid pipe is a straight pipe. As a result thereof, the SIN ratio in calculating the phase difference of oscillation is improved, and an improvement in the measurement precision is facilitated.

In one preferable embodiment of the present invention, both of the straight pipe portion and the bent portion are formed with the inner pipe and the outer pipe.

In this case, advantages such as an improvement in the rigidity can be obtained for both of the straight pipe portion and the bent portion of the fluid pipe.

In this case, in a further preferable embodiment, in the bent portion, a longitudinal direction of the fibers is set (oriented) to be tilted relative to the axial line of the fluid pipe. That is, it is preferable that the fibers are oriented in a spiral form.

For forming the bent portion at the time of production, the inner pipe on which the fibers are wound is bent in a state in which the resin is not yet cured (prepreg) or a state in which the resin is not yet applied. During this period, the fibers that are parallel to the axial line of the fluid pipe must be contracted on the inner side of the bent portion and be elongated on the outer side of the bent portion. However, when the fibers are parallel to the axial line, the fibers may be cut at the time of bending or be deformed in such a manner that a bamboo is split, because the fibers are hardly contracted or elongated.

In contrast, the fibers that are oriented in a tilted manner relative to the axial line of the fluid pipe can move while changing the orientation angle in the bent portion at the time of bending. Hereafter, this will be described with reference to FIGS. 4 to 6

Figure 4A:
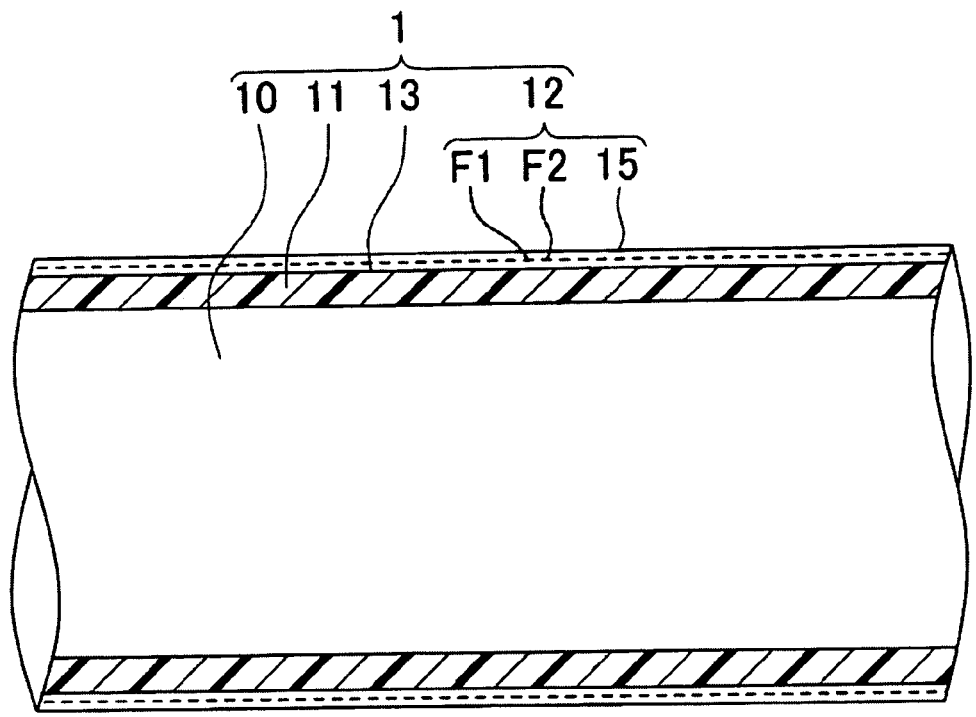
FIG. 4A is an enlarged cross-sectional view of the fluid pipe.
Figure 4B:
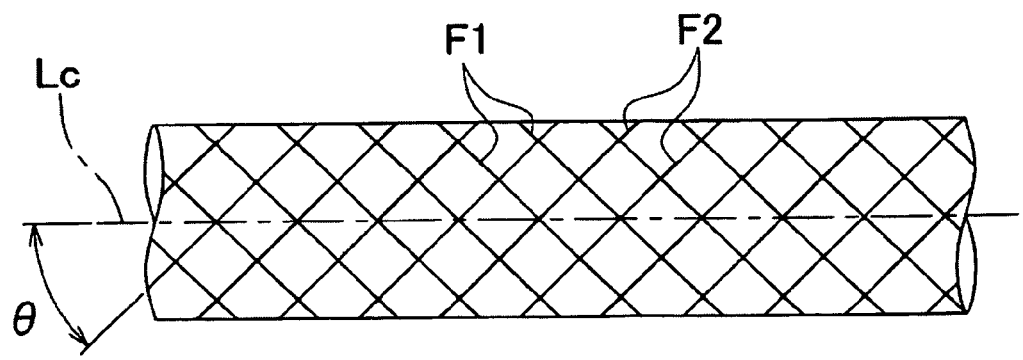
FIG. 4B is a model side view illustrating an orientation of fibers.

Now, when the fibers include first fibers F1 that lie along the first spiral direction and second fibers F2 that lie along the second spiral direction as shown in FIG. 4B, when a straight pipe including the fibers F1, F2 is bent to form a bent portion C of FIG. 5(a), the inner side IN of the bent portion C of FIG. 5(c) is contracted, and the outer side OUT of the bent portion C of FIG. 5(b) is elongated, as will be understood from these Figures.

Herein, for simplifying the description, the first fibers F1 and the second fibers F2 will be illustrated in separation in FIGS. 6(a) and 6(d).

Regarding the fibers F1, F2 that lie along the first or second spiral direction of FIG. 4B, when one attempts to bend the whole pipe, the angle $\theta$ formed by the axial line Lc and the fibers F1, F2 (hereafter referred to as an "orientation angle") is smaller as compared with the straight pipe portions S1 to S3 in order to meet the elongation of the outer side, as shown in FIGS. 6(b) and 6(e).

On the other hand, regarding the fibers F1, F2 that lie along the first or second spiral direction of FIG. 4B, when one attempts to bend the whole pipe, the above described orientation angle $\theta$ is larger as compared with the straight pipe portions S1 to S3 in order to meet the contraction of the inner side, as shown in FIGS. 6(c) and 6(f).

Figure 5:
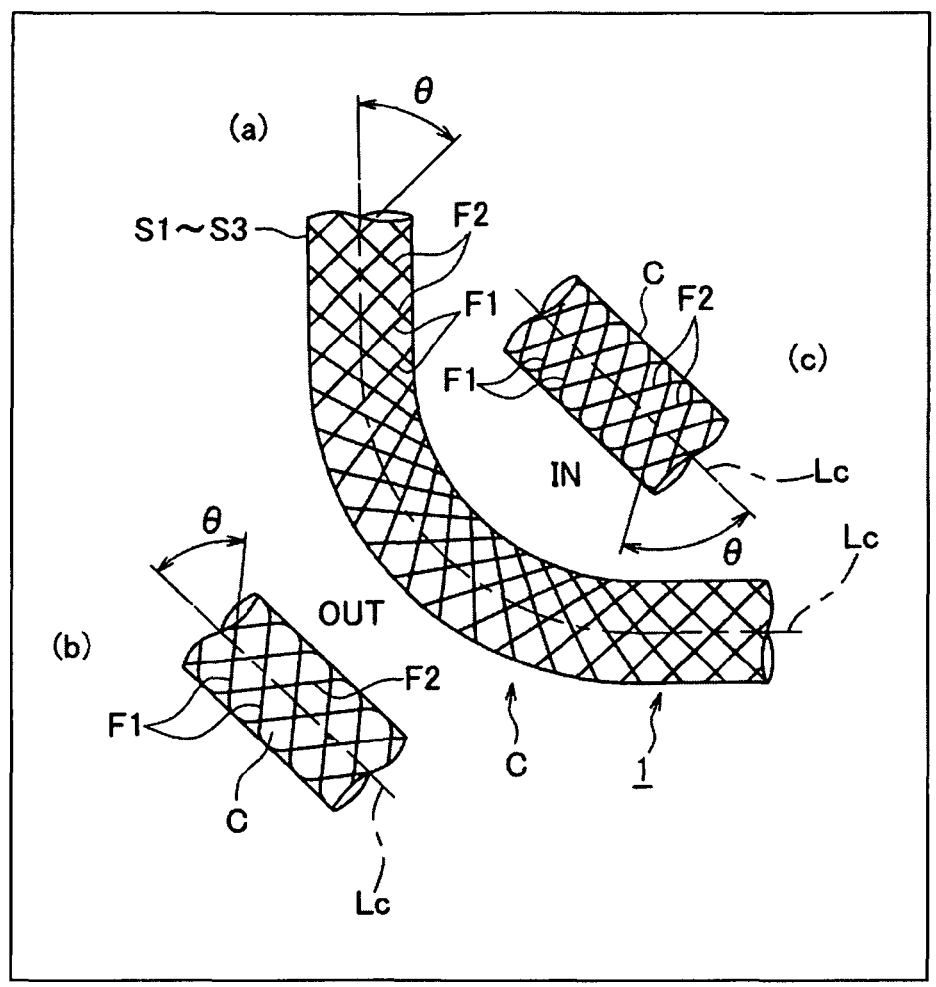
FIG. 5 is a model view showing the orientation of fibers and the bulk density in the bent portion, where
Figure 6:
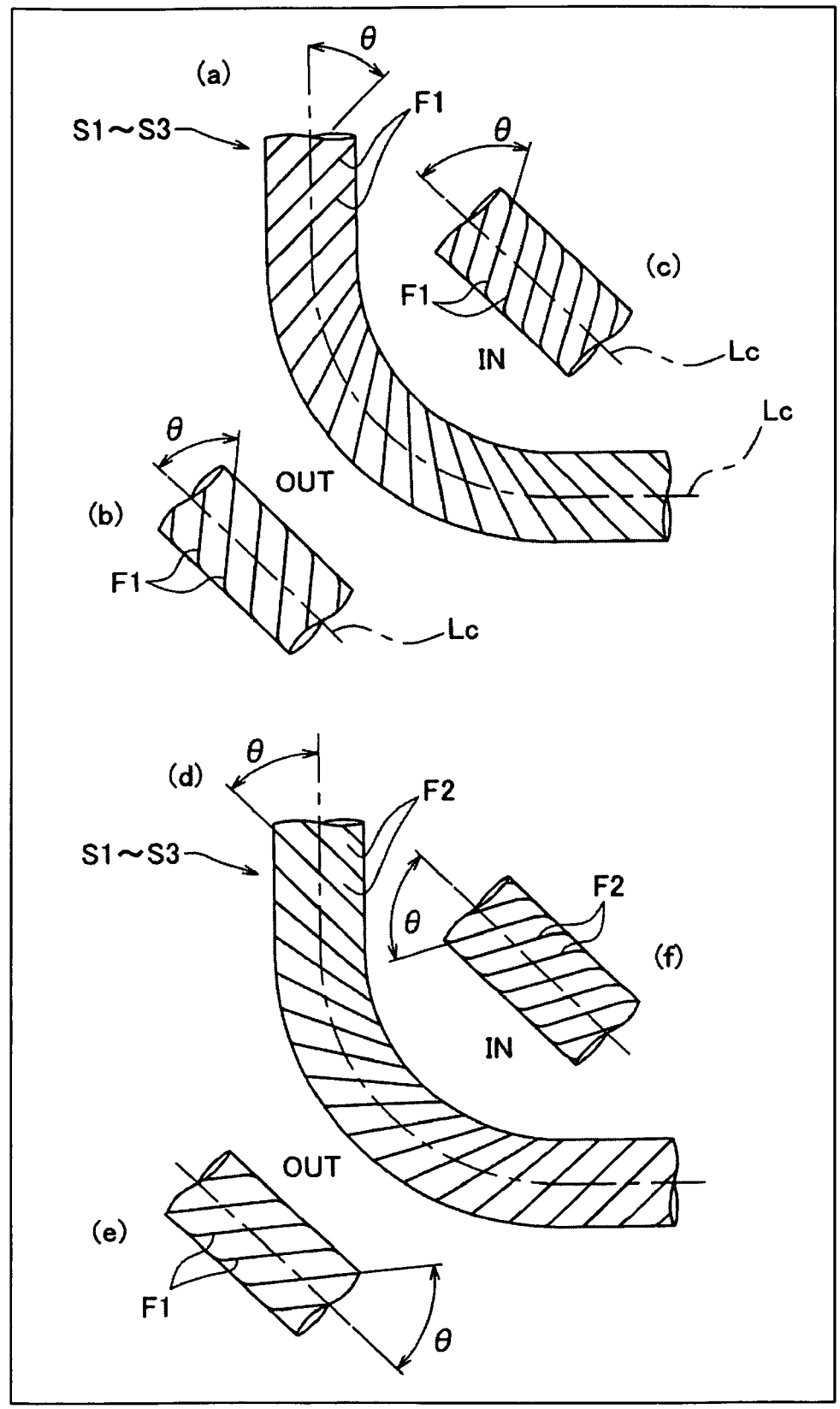
FIG. 6 is a model view showing the orientation of fibers and the bulk density in the bent portion, where

In other words, the orientation angle $\theta$ in the bent portion C is larger on the inner side IN of the bent portion C than on the outer side OUT of the bent portion C In accordance with such a change in the orientation angle $\theta$, in the bent portion C, the number of the fibers F1, F2 on the inner side IN of the bent portion C per unit area is larger than the number of the fibers F1, F2 on the outer side OUT of the bent portion C per unit area, as will be understood from FIGS. 6 and 5.

Further, in order to allow the bending of the pipe, it is further preferable that no fibers are arranged along the axial line of the fluid pipe on both an inner side and an outer side of the bent portion.

In addition, even if fibers arranged along the axial line of the fluid pipe are arranged at the portion shown by a one-dot chain line (the position parallel to the axial line Lc) in FIG. 5(a) that are neither contracted nor elongated before and after the bending, it will not be an obstacle against this bending.

In another preferable embodiment of the present invention, the straight pipe portion is formed with the inner pipe and the outer pipe, and the bent portion is formed with the inner pipe that is not covered with the outer pipe.

In this case, since the straight pipe portion is reinforced by the outer pipe having a large elastic modulus, the rigidity of the fluid pipe as a whole is improved. On the other hand, since the bent portion is not covered with the outer pipe, it is sufficient to bend only the inner pipe at the time of production, so that the fibers are not cut, thereby enabling the production.

In the present invention, the fibers are a reinforcing material that reinforces the resin of the outer pipe, and therefore, the outer pipe is a fiber reinforced composite material.

As the resin, a thermosetting resin can be generally used. One can also use an ultraviolet curing resin or a chemical reaction type curing resin such as a two-liquid type.

As the thermosetting resin, for example, a resin such as epoxy, unsaturated polyester, bismaleimide, or polyamide can be used. Among these resins, epoxy has high strength, high temperature resistance, and high chemical resistance, and is also excellent in processability, so that epoxy can be suitably adopted.

On the other hand, as the fibers, nonmetal fibers are preferable. For example, besides glass, carbon, aramide or boron can be employed. The carbon fibers have a high strength, whereas the glass fibers are less likely to be bent and broken during the process of bending the fluid pipe and are inexpensive though having smaller strength than the carbon fibers.

Herein, fibers made of a metal can be used in a case where the elution of metal ions does not raise a problem though the metal corrosion by the measurement fluid raises a problem, or in a like case. In particular, it is effective when the fluid pipe has a small diameter and it is difficult to confirm whether the coating has been performed completely.

In a preferable embodiment of the present invention, the fibers are assembled in a weave form that surrounds an outer circumference of the inner pipe, and the resin is cured in a state of close adhesion between the fibers assembled in a weave form.

The fibers assembled in a weave form improves the strength of the outer pipe in the two directions along which the fibers are arranged in order.

In the present invention, the term "assembled in a weave form" means a structure in which longitudinal threads and lateral threads are combined and woven by a weaving machine. For example, a weave structure such as satin weave, a twill weave, or a plain weave can be adopted.

In producing the fluid pipe by winding around the inner pipe a prepreg in which the fibers are arranged in an uncured resin, the fibers must move within the uncured thermosetting resin during the process of bending the fluid pipe. Therefore, as the fiber structure, a satin weave which is loose is preferable rather than a firm fabric such as a plain weave.

In addition, the term "arranged in order" includes a case in which the fibers are arranged generally in parallel within the resin in addition to a case in which the fibers are "assembled in a weave form".

Herein, as the fluororesin forming the inner pipe, for example, perfluoroalkoxy (PFA) can be employed.

It is preferable that the element to be detected of each of the first and second detectors is fixed to the outer pipe.

It is easier to fix the element to be detected to the outer pipe made of a resin other than the fluororesin than to fix the element to be detected to the inner pipe made of a fluororesin.

EXAMPLES

Example 1

Hereafter, Example 1 of the present invention will be described with reference to FIGS. 1 to 7. Prior to the description of the essential parts of the present invention, the structure, the principle, and the like of a Coriolis mass flowmeter will be described.

Figure 1:
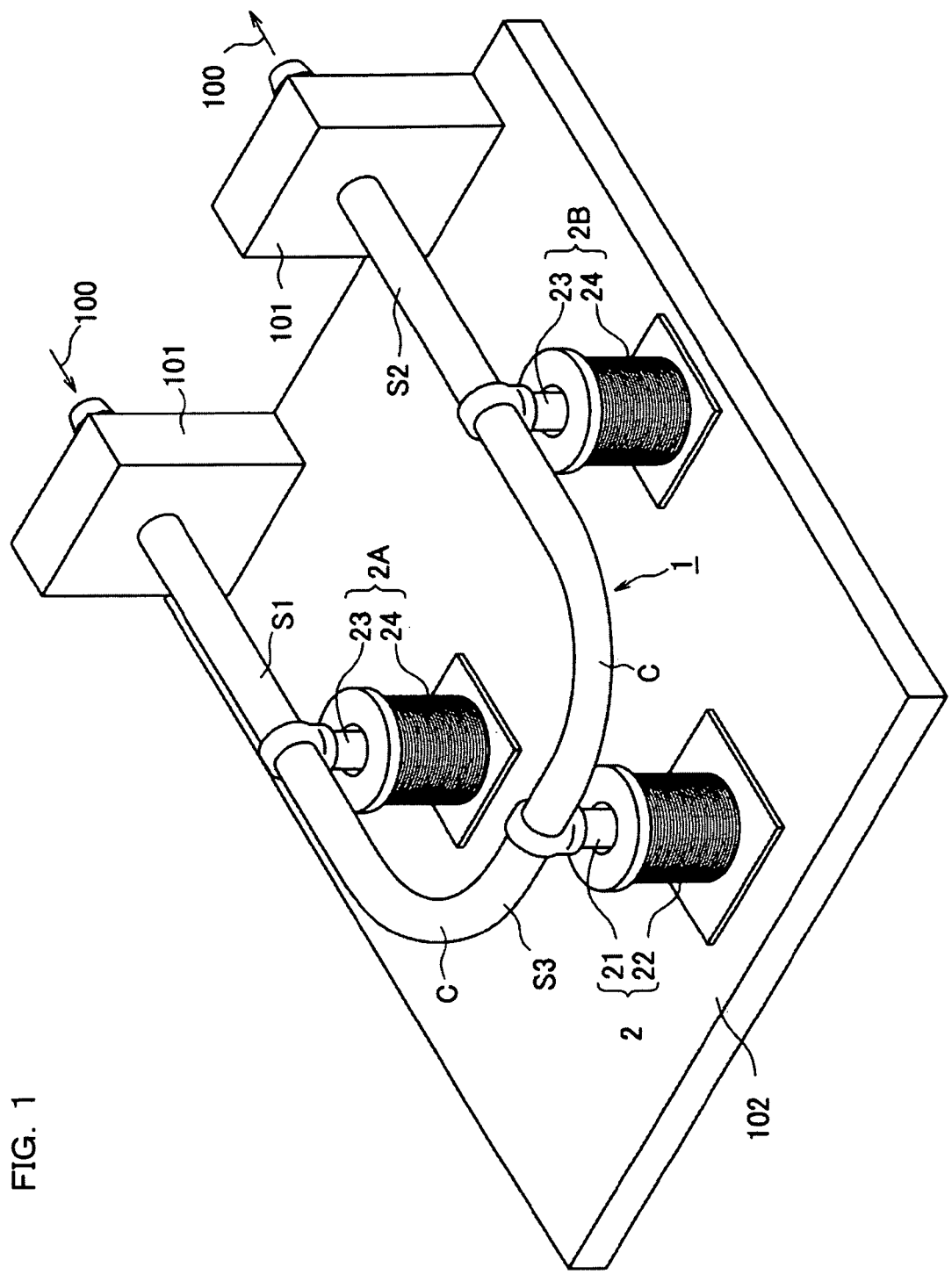
FIG. 1 is a schematic perspective view showing Example 1 of the flowmeter of the present invention.

In FIG. 1, an approximately U-shaped fluid pipe 1 has first to third straight pipe portions S1 to S3 and two bent portions C, thereby to form a flow path 10 of a measurement fluid 100 serving as an object of measurement (FIG. 4). The measurement fluid 100 is introduced from the first straight pipe portion S1 of the fluid pipe 1 and passes through the bent portion C, the third straight pipe portion S3, and the bent portion C to be guided to the outside from the second straight pipe portion S2.

The ends of the first and second straight pipe portions S1, S2, that is, the two ends of the approximately U-shaped fluid pipe 1 are fixed to a wall portion 101. When this is viewed from the viewpoint of structural mechanics, it is such a structure that the wall portion 101 serving as a support member supports the two ends of the fluid pipe 1 so that the two ends are fixed ends relative to the vibration generated by the oscillation of the oscillator 2 mentioned later, that is, it is similar to a structure in which the fluid pipe 1 is supported in a cantilever beam state. As a result of this, as shown in the model view of FIG. 3A, it can be warped with its axis lying on the two ends inserted into the wall portion 101, that is, on the fixed ends of the vibration generated by the oscillation or the neighborhood thereof.

In FIG. 1, in the middle portion of the fluid pipe 1, that is, in the third straight pipe portion S3, an oscillator 2 is disposed. The oscillator 2 is made of a permanent magnet 21 fixed to the third straight pipe portion S3 and an electromagnetic driving coil 22 fixed onto a base 102. The permanent magnet 21 is inserted into the electromagnetic driving coil 22 and oscillates the fluid pipe 1 by passing an alternating electric current through the electromagnetic driving coil 22 by an oscillation circuit 34.

On the other hand, in the first and second straight pipe portions S1, S2, there are disposed first and second detectors 2A, 2B. That is, the first and second detectors 2A, 2B are disposed to be spaced apart from each other on the upstream side and the downstream side of the third straight pipe portion that lies along the flow path 10 of the fluid pipe 1. Each of the detectors 2A, 2B of FIG. 1 is made of a publicly known electromagnetic pick-up and detects the velocity of the vibration which is one of the vibration states of the fluid pipe 1 in the vertical direction when the elements 23 to be detected made of a permanent magnet perform reciprocal movement within the coil 24.

Figure 2:
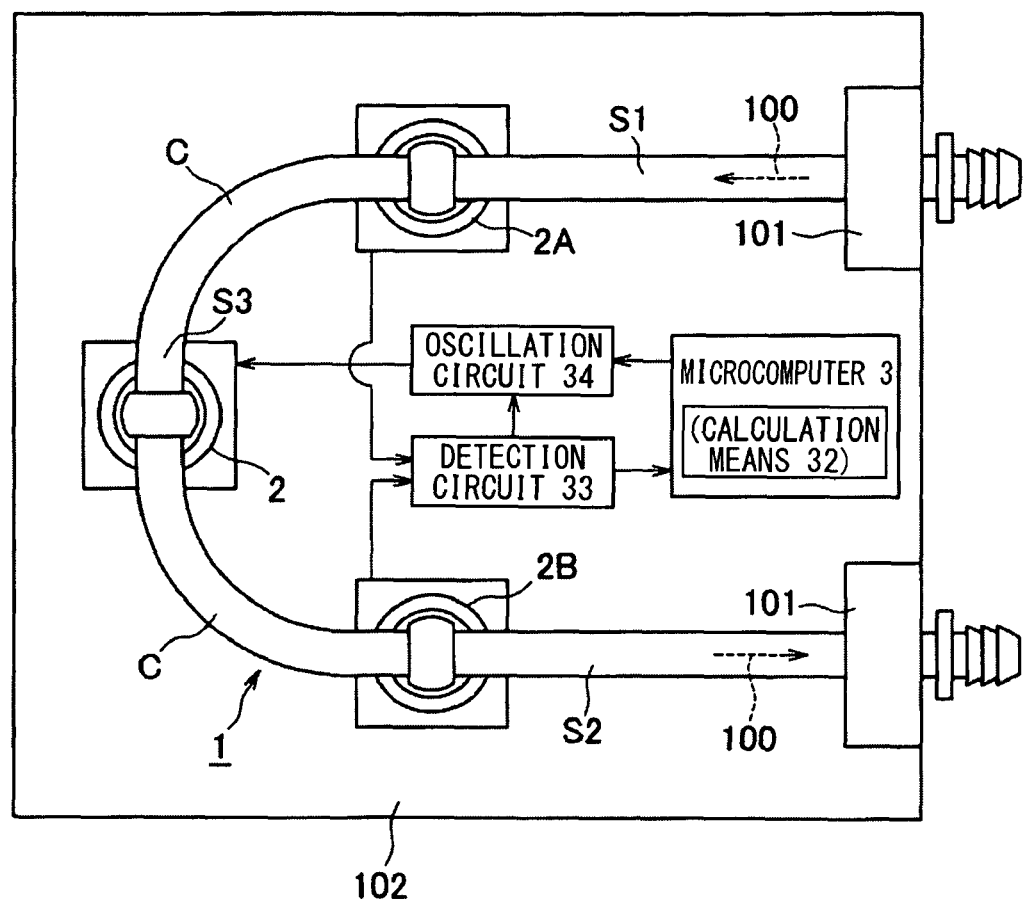
FIG. 2 is a schematic structural view illustrating Example 1 of the flowmeter of the present invention.

In FIG. 2, the signal related to the velocity of the vibration detected by the first detector 2A passes through the detection circuit 33 to be transmitted to the calculator 32 of the microcomputer 3 and to be transmitted to the oscillation circuit 34. The oscillation circuit 34 supplies to the electromagnetic driving coil 22 constituting the oscillator 2 an electric current that accords to the magnitude and the positive or negative direction of the signal related to the velocity of the vibration detected by the first detector 2A so that a positive feedback may be provided. At this time, the positive feedback is applied at a specific characteristic frequency of the fluid pipe 1 which is a frequency at which the vibration is hardly attenuated by the oscillation, and an electric oscillation state is generated, whereby the vibration at the basic characteristic frequency can be maintained at a constant level. In addition, by adjusting the arrangement of the first detector 2A and the positive or negative direction of the positive feedback, the vibration of the fluid pipe 1 can be maintained selectively at a higher specific frequency among the characteristic frequencies of the fluid pipe 1 that are present in a plurality.

Figure 3A:
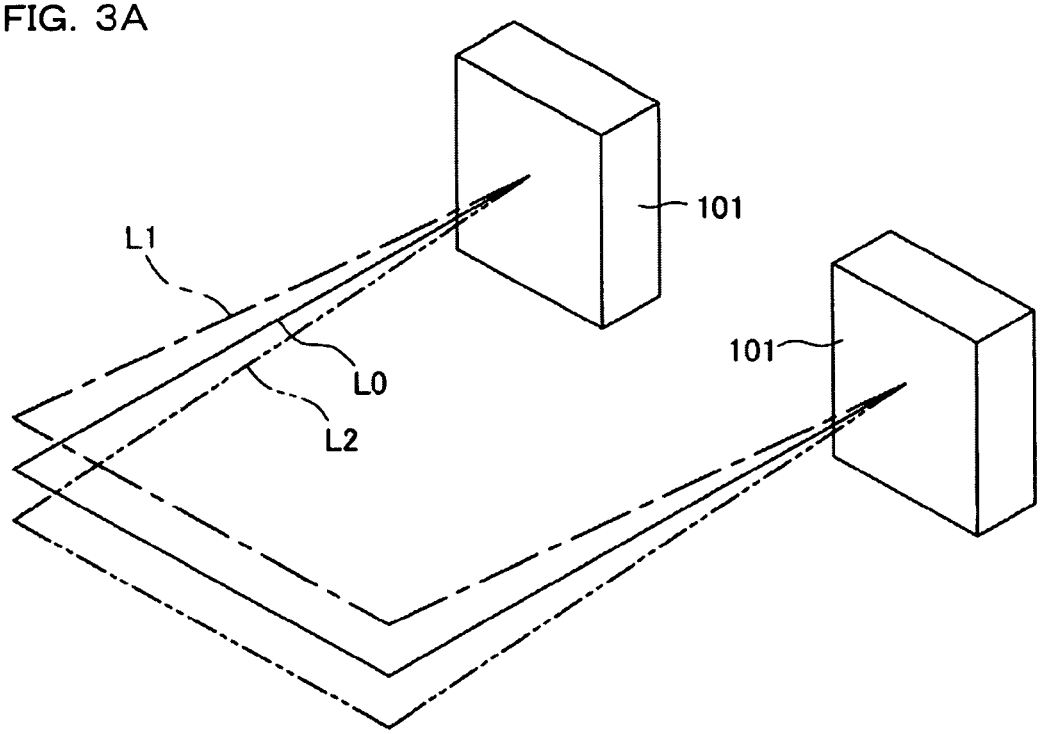
FIGS. 3A and 3B are perspective views illustrating a principle of the flow meter.

When a setting is made to oscillate at the basic characteristic frequency, the fluid pipe 1 vibrates while warping up and down in the order of the one-dot chain line L1, the solid line L0, and the two-dot chain line L2 of FIG. 3A by the oscillation.

Figure 3B:
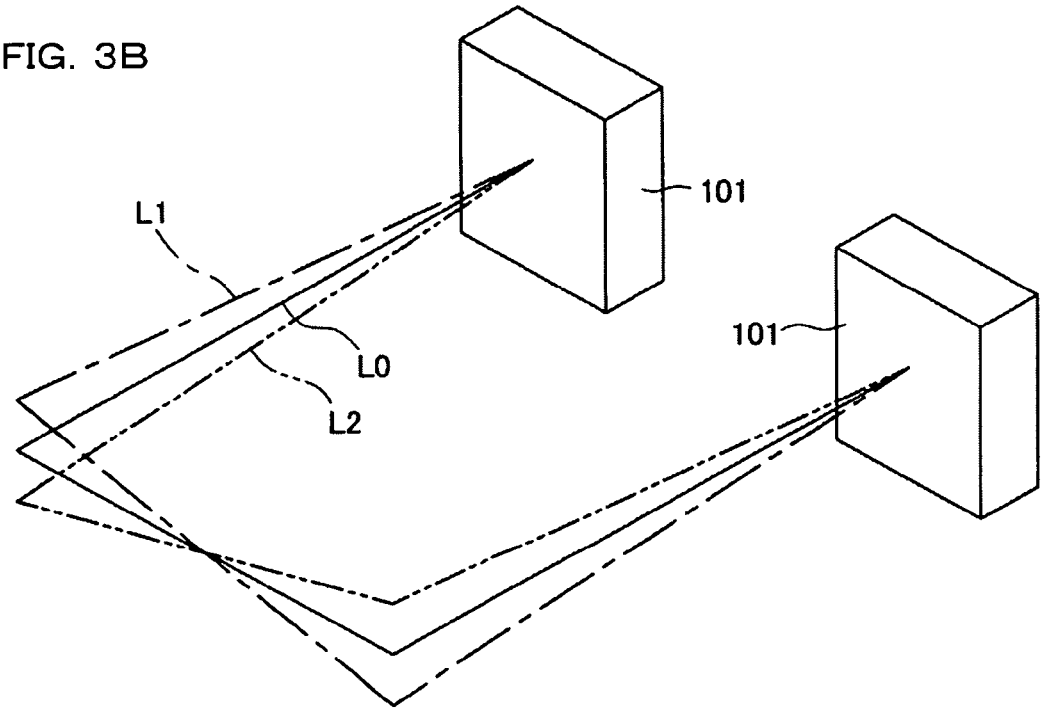

On the other hand, by the oscillation and the flow of the measurement fluid 100 (FIG. 1), what is known as a Coriolis force acts on the fluid pipe 1, whereby the fluid pipe 1 warps and vibrates up and down while being twisted as shown in FIG. 3B.

The magnitude of the Coriolis force is proportional to the mass of the fluid that flows through the fluid pipe 1, the velocity thereof, and the angular velocity of the oscillation, and the direction of the force coincides with the direction of the vector product of the movement direction (velocity vector) of the fluid and the angular velocity at which the fluid pipe 1 is oscillated. Also, since the flow direction of the fluid is opposite on the entrance side and on the exit side of the fluid in the fluid pipe 1, the force that acts on the first and second straight pipe portions S1, S2 is opposite in the up-and-down direction. For this reason, a torque of twist is generated in the fluid pipe 1 by the Coriolis force. This torque changes at the same frequency as the oscillation frequency, and the amplitude value thereof and the mass flow rate of the fluid will have a predetermined relationship.

The warpage of the fluid pipe 1 of FIG. 3A by the oscillation and the twist of the fluid pipe 1 of FIG. 3B by the Coriolis force are superposed on each other. The calculator 32 of the microcomputer 3 of FIG. 2 calculates the mass of the measurement fluid 100 that passes through the fluid path 10 of the fluid pipe 1 on the basis of the phase of the amplitude of the twist, that is, the phase difference of the velocity signals of vibration at respective positions constituting the information of each vibration detected by the detectors 2A, 2B.

In FIG. 4A, the fluid pipe 1 is made of an inner pipe 11 that is in contact with the flow path 10 and an outer pipe 12 that is laminated on the outer circumferential surface of the inner pipe 11. The inner pipe 11 is made of a fluororesin, and is produced by extrusion molding.

The outer pipe 12 is obtained, for example, by winding a prepreg in which glass fibers are arranged in an uncured epoxy resin, around the outer circumference of the inner pipe 11 and curing, and has an elastic modulus larger than that of the inner pipe 11. That is, the outer pipe 12 has fibers F1, F2 that are arranged in order on the outer circumferential surface 13 of the inner pipe 12 and a resin (matrix) 15 for bonding and fixing the fibers F1, F2 to the inner pipe 11 or forming the fibers F1, F2 in a manner capable of being fixed by pressing. Here, the uncured epoxy resin includes those having a low fluidity, that is, those in a half-cured state. By maintaining the temperature of the epoxy resin in a half-cured state (uncured) to be above an ordinary temperature and below the curing temperature, the resin is softened to improve the processability. Since the epoxy resin is a thermosetting resin, the epoxy resin in a half-cured state is brought into a completely cured state by maintaining the temperature at a predetermined curing temperature or higher. This curing temperature is lower than the maximum continuous-use temperature of the fluororesin constituting the material of the inner pipe 11. This allows formation of the outer pipe 12 while maintaining the shape of the inner pipe 11. On the other hand, the temperature for allowing a thermoplastic resin to have fluidity is generally higher than the maximum continuous-use temperature of the fluororesin, so that it is difficult to form the outer pipe 12 on the molded inner pipe 11 by injection molding or the like.

The fibers F1, F2 and the resin 15 cover the inner pipe 11 and are at the same time in a state of enclosing the inner pipe 11. The elements to be detected (permanent magnets) 23 and the permanent magnet 21 of FIG. 1 are fixed to the outer pipe 12 of the straight pipe portions S1, S2, S3 (FIG. 4) with a fixing tool.

In the present Example, for example, as shown in FIG. 4B and FIGS. 7A, 7B, 7C, the fibers F are assembled in a fabric form that surrounds the outer circumference of the inner pipe 11, and the resin 15 of FIG. 4A is cured in a state of being in close adhesion to the fibers F between the fibers F assembled in a fabric form. Herein, in the present Example, the satin weave of FIG. 7A is adopted, where the fibers F1, F2 extending in first and second spiral directions that cross each other are assembled in a fabric form.

In the present Example, all of the above-described straight pipe portions S1 to S3 and the bent portion C of FIG. 1 are formed with the inner pipe 11 and the outer pipe 12. In the straight pipe portions S1 to S3 and the bent portion C, the longitudinal direction of each fibers F is set to be tilted relative to the axial line Lc of the fluid pipe 1, as shown in FIG. 5(a).

On the other hand, in the straight pipe portions S1 to S3 and the bent portion C, no fibers are present whose longitudinal directions are arranged along the axial line Lc of the fluid pipe 1.

In the present invention, the production method is not limited; however, as a method of producing the above-described fluid pipe 1, an example will be described in which a sheet winding process is adopted.

First, a sheet of prepreg is wound around the inner pipe 11 of FIG. 4 so that the sheet of prepreg will have a predetermined thickness. In this state, the temperature is raised up to the temperature at which the viscosity of the epoxy resin of the prepreg lowers, and thereafter a preliminary molding step is carried out by manual work for bending into a U-shape.

During this preliminary molding, the pipe is elongated on the outer side OUT of the bent portion C of FIG. 5(a), and the pipe is contracted on the inner side IN of the bent portion C. In order to meet the elongation on the outer side OUT, the fibers F1, F2 move within the uncured resin, whereby the orientation angle θ is small on the outer side OUT, and the orientation angle θ is large on the inner side IN in order to meet the contraction of the inner side IN.

In accordance with such a change in the orientation angle θ, as will be understood from FIGS. 6 and 5, in the bent portion C, the number of the fibers F1, F2 on the inner side IN of the bent portion C per unit area is larger than the number of the fibers F1, F2 on the outer side OUT of the bent portion C per unit area.

After the above preliminary molding, the pipe bent in a U-shape is set in a mold, and pressurized and heated for a predetermined period of time in a clamped state, so as to cure the sheet of prepreg. After the curing, the pipe is taken out from the mold.

By the above pressurizing force, the fibers of the outer pipe 12 of FIG. 4 are shaped to press the outer circumferential surface 13 of the inner pipe 11, and are fixed with the epoxy resin so as to maintain the shape of pressing the outer circumferential surface 13. As a result of this, the state in which the inner pipe 11 and the outer pipe 12 are integrated is stabilized. In other words, the friction force generated between the inner pipe 11 and the outer pipe 12 increases, thereby preventing the escape or slippage of the inner pipe 11.

Meanwhile, in the present Example, in order to facilitate the drawing, the orientation angle θ in the straight pipe portions S1 to S3 is set to be 45° and illustrated. However, it is sufficient that the orientation angle θ is not 0° or 90° in the bent portion C, and the orientation angle θ may be an angle capable of allowing the movement of the fibers F1, F2 when the pipe is bent.

In the above Example, the fibers F1, F2 assembled in a fabric form are adopted. However, one may use the fibers F1, F2 which are arranged in parallel respectively in different prepregs. In this case, the angle formed by the two fibers F1, F2 need not be 90°. Also, the fibers may be disposed only in one spiral direction.

In the above sheet winding process, a prepreg is used in which a sheet assembled in a fabric form is impregnated with a thermosetting resin (resin is allowed to penetrate around the fibers); however, one can also use a blade in which the fibers are formed in a net form.

Next, a blading process using the above blade will be described. In the present blading process, one uses a material having a form of fabric called a net-shaped blade 50. This blade 50 is in a fabric form made of fibers F1, F2.

Figure 8A:
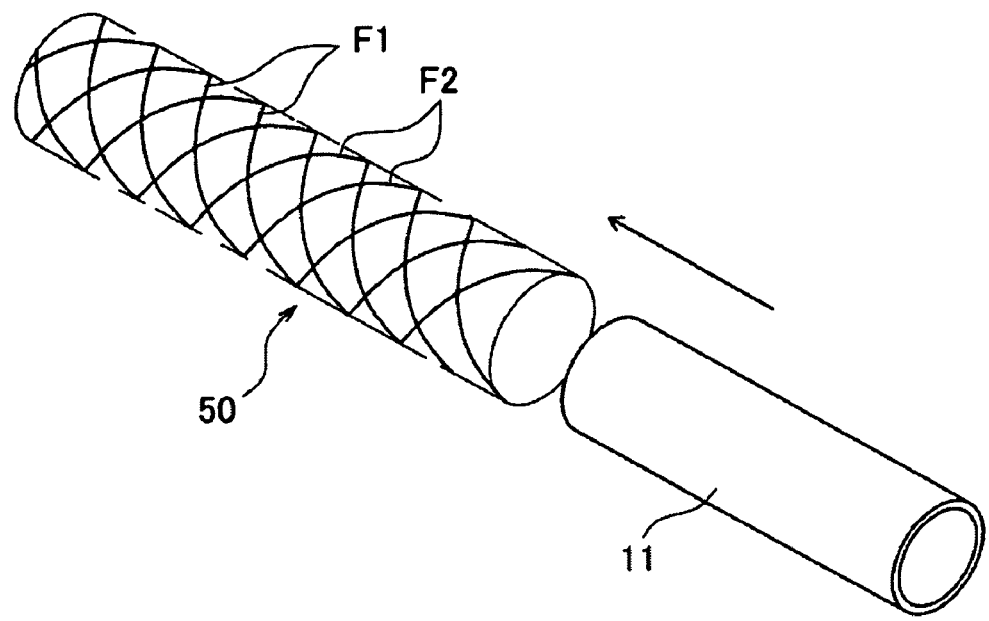
FIGS. 8A and 8B are a perspective view and a plan view illustrating one example of a production method.
Figure 8B:
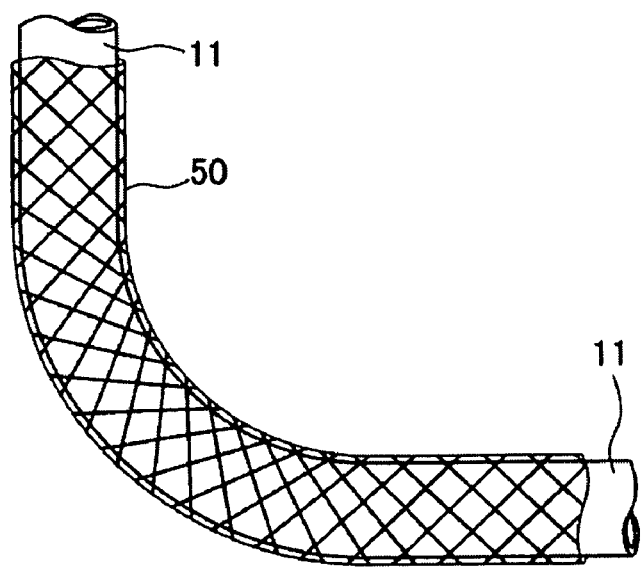

First, as shown in FIG. 8A, a straight pipe made of fluororesin that becomes an inner pipe 11 is inserted into the blade 50. Next, as shown in FIG. 8B, the inner pipe 11 is bent in a predetermined form together with the blade 50. Thereafter, an ultraviolet curing resin or a chemical reaction type resin is applied onto the blade 50 or the blade 50 is impregnated with an ultraviolet curing resin or a chemical reaction type resin, so as to attach the ultraviolet curing resin or a chemical reaction type resin to the blade 50, followed by curing the resin by ultraviolet rays or by chemical reaction.

Example 2

FIGS. 9A to 9D show Example 2 of the present invention.

In the above Example 1, all of the bent portion C and the straight pipe portions S1 to S3 of the U-shaped fluid pipe 1 are formed with the inner pipe 11 and the outer pipe 12. In the present Example, the straight pipe portions S1 to S3 are formed with the inner pipe 11 and the outer pipe 12, and the bent portion C is formed with the inner pipe 11.

In this case, the bent portion C may be formed only with the inner pipe 11; however, the bent portion C may be covered with an epoxy resin or the like not having the fibers F1, F2. By covering with the epoxy resin or the like, the rigidity and the chemical resistance of the fluid pipe 1 are improved.

Figure 9A:
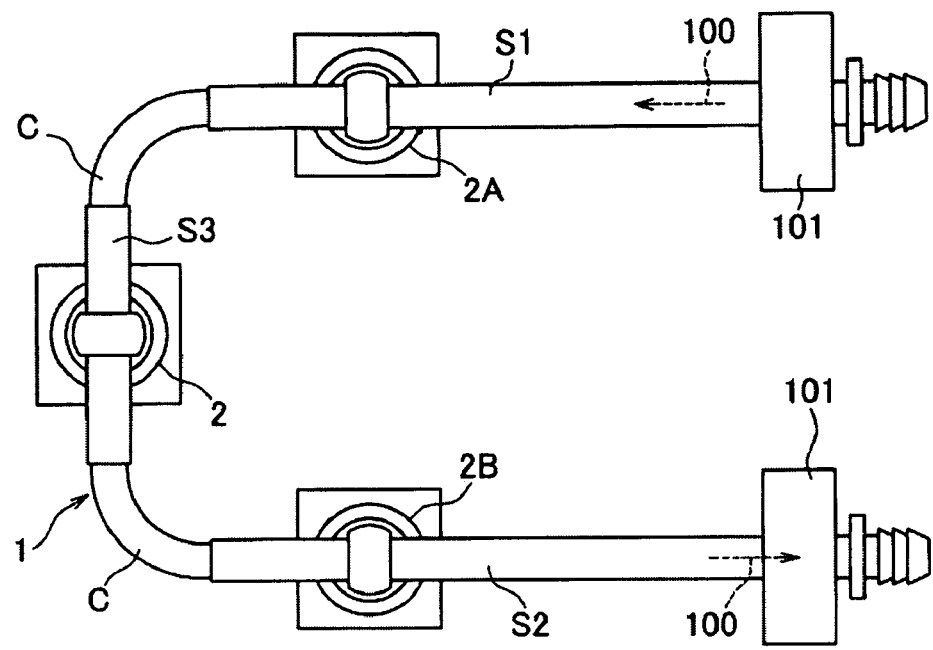
FIGS. 9A to 9D are a schematic plan view of the flowmeter showing Example 2 and model plan views showing the orientation of fibers.
Figure 9B:
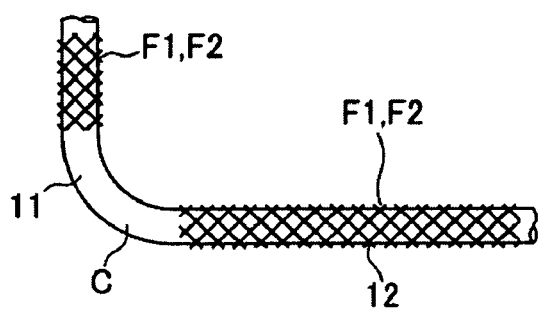
Figure 9C:
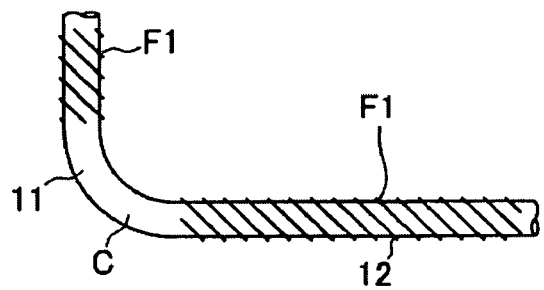

Further, regarding the fibers of the straight pipe portions S1 to S3, the fibers F1, F2 may be oriented in two spiral directions as shown in FIG. 9B, or only the fibers F1 may be arranged in order and oriented only in one spiral direction as shown in FIG. 9C.

Figure 9D:
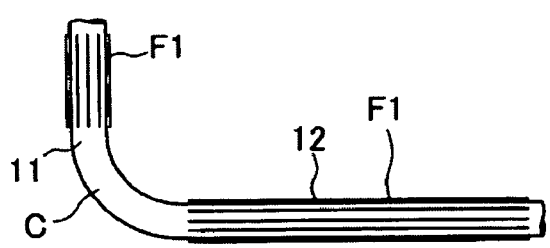

Furthermore, as shown in FIG. 9D, the fibers F1 may be oriented in parallel to the axial line of the straight pipe portions S1 to S3 in order to enhance the bending rigidity of the straight pipe portions S1 to S3. In this case, this is because the straight pipe portions S1 to S3 are not bent, so that the fibers F1 do not hinder the bending. Herein, when the fibers F1 are oriented as shown in FIG. 9D, that is, when the orientation angle is 0°, the bending rigidity of the pipe is enhanced as compared with the cases of other orientation angles.

Example 3

Figure 10:
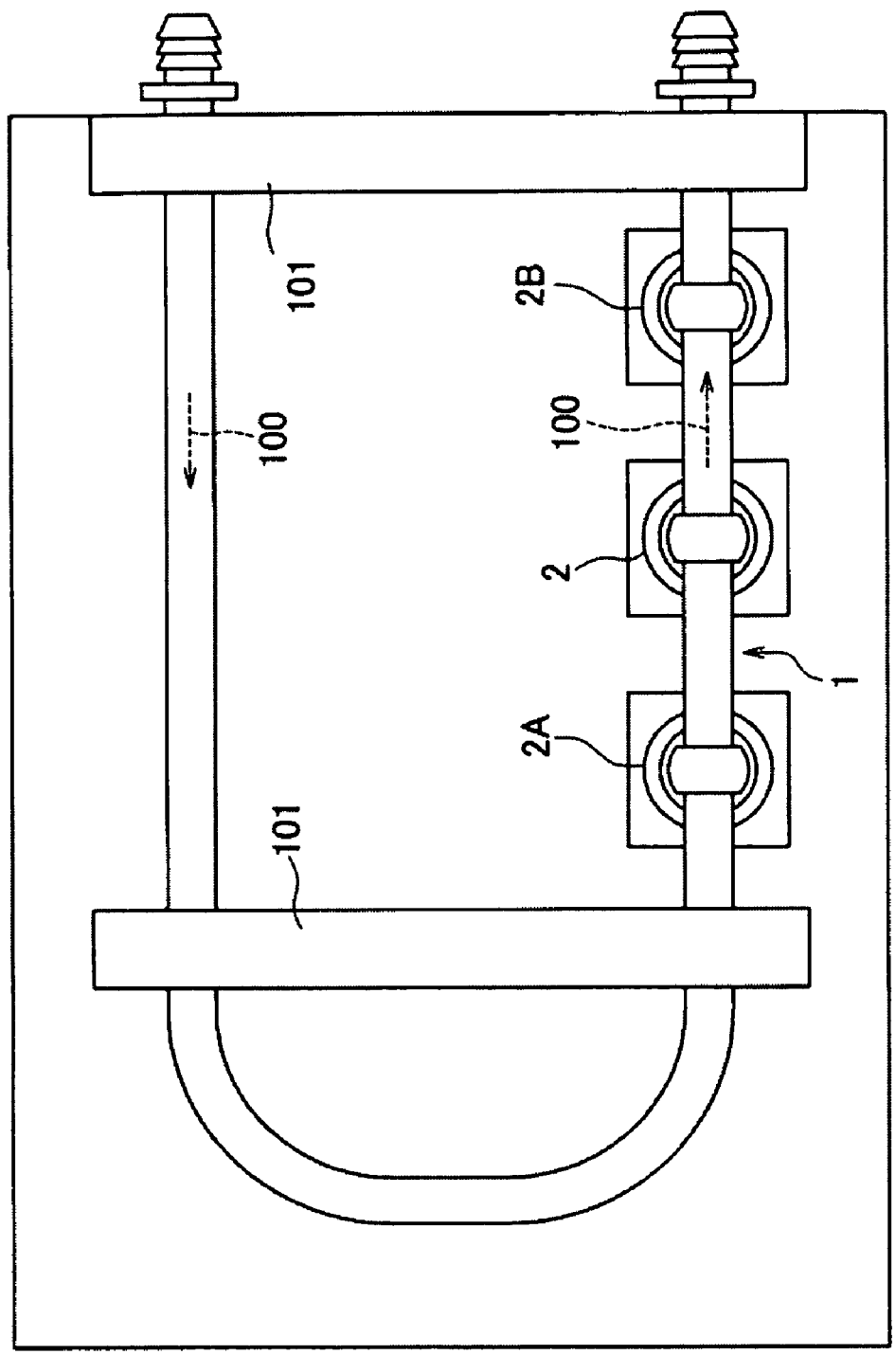
FIG. 10 is a schematic plan view of a flowmeter showing Example 3.

FIG. 10 shows Example 3 of the present invention.

In the above Examples 1 and 2, the bent portion C is included between the two detectors 2A and 2B as shown in FIG. 1; however, the bent portion C may be absent between the two detectors 2A and 2B as shown in FIG. 10.

Herein, in each of the above-described Examples, a case having two layers has been described; however, the fluid pipe may be made of three or more layers.

For example, the outside of the outer pipe 12 of FIG. 4 may be covered with another resin or the like, so as to improve the adhesiveness or the outer appearance, or to enhance the fixing force of the elements to be detected.

On the other hand, another resin or the like may be inserted between the inner pipe 11 and the outer pipe 12 of FIG. 4. For example, in order to improve the adhesiveness of the inner pipe 11 and the outer pipe 12, an underlying material (primer) having an affinity to both of the inner pipe 11 and the outer pipe 12 may be inserted.

The present invention can be applied to what is known as a Coriolis mass flow meter.

What is claimed is:

1. A coriolis mass flowmeter comprising:
   an oscillator for oscillating a fluid pipe that forms a flow path for allowing a measurement fluid to flow;
   first and second detectors that are disposed to be spaced apart from each other along the flow path of the fluid pipe so as to detect a state of oscillation of the fluid pipe;
   a calculator for calculating a mass flow rate of the measurement fluid that passes through the flow path of the fluid pipe on the basis of a relative amount of the states of oscillation that are detected by the first and second detectors, and
   a support member that supports two ends of the fluid pipe so that the two ends are fixed ends to the oscillator,
   wherein the fluid pipe comprises:
   a bent portion whose axial line is bent between the two ends,
   an inner pipe made of a fluororesin whose inner circumferential surface is in contact with the flow path; and
   an outer pipe having fibers that are arranged in order to surround an outer circumferential surface of the inner pipe and a resin that is cured in a state of close adhesion between the fibers arranged in order, and having an elastic modulus larger than that of the inner pipe,
   wherein the fibers are in a fabric form extending in first and second spiral directions that cross each other to surround the outer circumference of the inner pipe.

2. The flowmeter according to claim 1, wherein no fibers are arranged along the axial line of the fluid pipe on both an inner side and an outer side of the bent portion.

3. The flowmeter according to claim 1, wherein, in the bent portion, the number of the fibers on an inner side of the bent portion per unit area is larger than the number of the fibers on an outer side of the bent portion per unit area.

4. The flowmeter according to claim 1, wherein an angle formed by the fibers and the axial line of the fluid pipe in the bent portion is larger on an inner side of the bent portion than on an outer side of the bent portion.

5. The flowmeter according to claim 1, wherein the fluid pipe includes a bent portion whose axial line is bent between the two detectors.

6. The flowmeter according to claim 1, wherein the fluid pipe includes a straight pipe portion whose axial line is a straight line between the two detectors.

7. The flowmeter according to claim 1, wherein the fluid pipe includes a bent portion whose axial line is bent between the two detectors and a straight pipe portion whose axial line is a straight line between the two detectors.

8. The flowmeter according to claim 7, wherein the fluid pipe is formed approximately in a U-shape between the two detectors.

9. The flowmeter according to claim 7, wherein both of the straight pipe portion and the bent portion are formed with the inner pipe and the outer pipe.

10. The flowmeter according to claim 7, wherein the straight pipe portion is formed with the inner pipe and the outer pipe, and the bent portion is formed with the inner pipe that is not covered with the outer pipe.

11. The flowmeter according to claim 1, wherein the weave structure of the fibers is a satin weave.

12. The flowmeter according to claim 1, wherein the fibers are glass fibers or carbon fibers.

13. The flowmeter according to claim 1, wherein the resin is a thermosetting resin.

14. The flowmeter according to claim 13, wherein the thermosetting resin is an epoxy resin.

15. The flowmeter according to claim 1, wherein the fluororesin is perfluoroalkoxy.

16. The flowmeter according to claim 1, wherein an element to be detected of each of the first and second detectors is fixed to the outer pipe.

* * * * *